(12) United States Patent
Rosenes et al.

(10) Patent No.: US 12,363,088 B2
(45) Date of Patent: Jul. 15, 2025

(54) MANAGING NETWORK ACCESS FOR EDGE GATEWAY DEVICES

(71) Applicant: Dell Products L.P., Round Rock, TX (US)

(72) Inventors: Eliyahu Rosenes, Bet Shemesh (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/358,284

(22) Filed: Jul. 25, 2023

(65) Prior Publication Data

US 2025/0039160 A1 Jan. 30, 2025

(51) Int. Cl.
*H04L 9/40* (2022.01)
*H04L 12/66* (2006.01)
(52) U.S. Cl.
CPC .............. *H04L 63/08* (2013.01); *H04L 12/66* (2013.01)

(58) Field of Classification Search
CPC ................................. H04L 12/66; H04L 63/08
See application file for complete search history.

(56) References Cited

U.S. PATENT DOCUMENTS

| 2021/0021619 A1* | 1/2021 | Smith | H04L 63/145 |
| 2022/0116445 A1* | 4/2022 | Filippou | H04L 41/0853 |
| 2023/0229758 A1* | 7/2023 | Terpstra | G06F 21/572 |
| | | | 726/26 |

* cited by examiner

*Primary Examiner* — Benjamin A Kaplan
(74) *Attorney, Agent, or Firm* — WOMBLE BOND DICKINSON (US) LLP (57) ABSTRACT

Methods and systems for securing network access for edge gateway devices are disclosed. The network access may be secured for edge gateway devices through establishment of a communication channel. The communication channel may be established between an edge gateway device and an edge orchestrator. The edge orchestrator may manage operations of the edge gateway device after authenticating the edge gateway device. If the edge gateway device cannot be authenticated, then the edge orchestrator may limit activity with respect to the edge gateway device.

20 Claims, 7 Drawing Sheets

MANAGING NETWORK ACCESS FOR EDGE GATEWAY DEVICES

FIELD

Embodiments disclosed herein relate generally to device management. More particularly, embodiments disclosed herein relate to managing network access for edge gateway devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing edge gateway devices. The edge gateway devices may be placed at locations that subject them to potential physical compromise. To limit the impacts of such compromise, the edge gateway devices may be managed by requiring that the edge gateway devices authenticate themselves to other devices such as edge orchestrators.

The edge orchestrator may oversee operation of the edge gateway devices. The edge orchestrator may require the edge gateway device to authenticate itself with the edge orchestrator prior to trusting the edge gateway device. The edge gateway device may authenticate itself by providing proof of its digital identity.

The digital identity from the edge gateway device may be implemented, at least in part, using a key pair. A public key of the key pair may be used by the edge orchestrator to validate signed responses to authentication challenges issued to the edge gateway device.

If attempts at authentication of the edge gateway device fail, then the edge gateway device may be isolated and/or other remedial actions may be performed. By doing so, impacts of compromised edge gateway devices on other devices may be reduced.

In an embodiment, a method for managing network access of an edge gateway device is provided. The method may include (i) attempting, by the edge gateway device, to establish a communication channel with an edge orchestrator that is assigned to manage the edge gateway device, (ii) obtaining, by the edge gateway device, a challenge to the communication channel from the edge orchestrator, (iii) obtaining, by the edge gateway device, a response to the challenge using a digital identity that is secured by a trusted platform module of the edge gateway device, (iv) providing, by the edge gateway device, the response to the edge orchestrator, (v) obtaining, by the edge gateway device, a notification from the edge orchestrator, the notification indicating whether the edge orchestrator has validated the edge gateway device using the response, (vi) in a first instance of the obtaining the notification where the notification indicates that the edge orchestrator successfully validated the edge gateway device: completing establishment of the communication channel to the edge orchestrator, and (vii) in a second instance of the obtaining the notification where the notification indicates that the edge orchestrator was not successfully validated the edge gateway device: performing a remediation action to improve a likelihood of successfully establishing the communication channel.

The method may further include, prior to assigning the digital identity: generating the digital identity for the edge gateway device, storing the digital identity in a digital identity vault, storing a public key in a public key vault, wherein the public key is paired with the digital identity, assigning the digital identity to the edge gateway device on purchase of the edge gateway device, and assigning the edge orchestrator with a public key from a public key vault that pairs with the digital identity of the edge gateway device;

Assigning the digital identity may include storing the digital identity on a trusted platform module of the edge gateway device.

Storing the digital identity may include storing the digital identity in an immutable form in the edge gateway device.

Obtaining, by the edge gateway device, the notification from the edge orchestrator may include validating the digital identity of the edge gateway device corresponding with a public key on the edge orchestrator.

Obtaining, by the edge gateway device, the notification from the edge orchestrator that the edge orchestrator successfully validated the edge gateway device may include allowing further connection of the edge gateway device to the edge orchestrator; and managing of operations of the edge gateway device by the edge orchestrator.

Obtaining the notification where the notification indicates that the edge orchestrator was not successfully validated the edge gateway device may include restricting further connection of the edge gateway device to the edge orchestrator until remediation by the edge gateway device may be sufficient to establish the communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Figure 1:
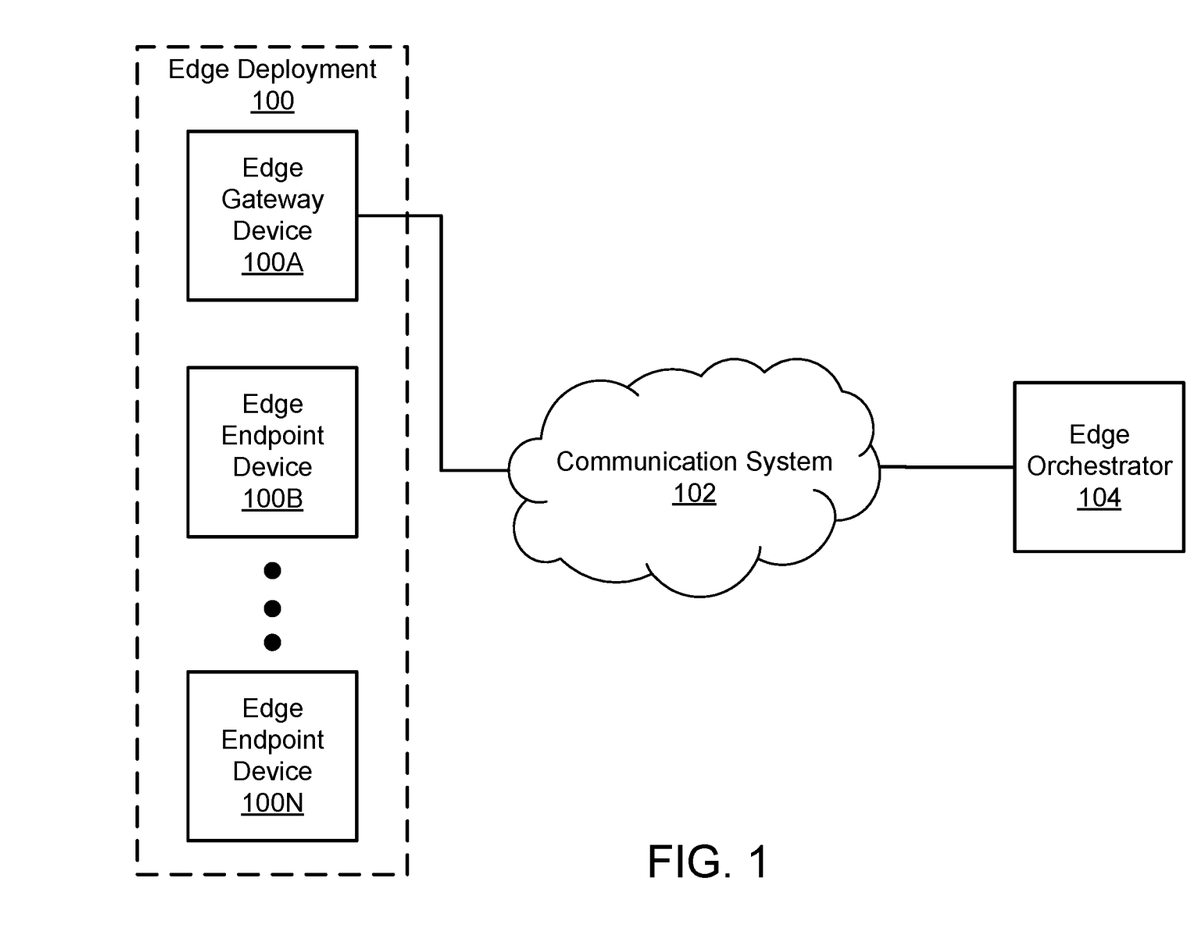
FIG. 1 shows a diagram illustrating a system in accordance with an embodiment.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include edge deployment 100. Edge deployment 100 may be deployed to a location where the computer implemented services are consumed.

For example, edge deployment 100 may be deployed to a retail shopping location. The components of edge deployment 100 may provide various computer implemented services that support a retail shopping business. In this example, the computer implemented services may include recording of financial transactions, providing information regarding potential transactions to consumers and operators of the business, collection of information regarding goods and/or services available from the retail shopping location, and/or other types of computer implemented services. While described with respect to the example of retail shopping, it will be appreciated that edge deployment 100 may be deployed to other types of locations where other types of computer implemented services may be provided to support the activities ongoing in these locations (e.g., such as manufacturing activity in a factory, stock management activity in a warehouse, etc.).

To provide these services, edge deployment 100 may include various edge endpoint devices (e.g., 100B-100N) and edge gateway device 100A. Edge endpoint devices 100B-100N may provide various types of computer implemented services. The specific services provided may be configured by, for example, modifying the operation of these devices by changing configuration settings, deploying different software components to these devices, and/or by performing other types of functionalities. These edge endpoint devices may include automation software that allows such changes to be made to the devices remotely.

To manage the services provided by edge endpoint devices 100B-100N, the system of FIG. 1 may include edge orchestrator 104. Edge orchestrator 104 may manage the edge endpoint devices by defining various personas that the edge endpoint devices are to adopt. The edge endpoint devices may ingest these personas into their automation software and update their operation accordingly. Edge orchestrator 104 may be remote to edge deployment 100. For example, edge orchestrator 104 may be part of a data center or other type of computing environment.

To facilitate communications between edge endpoint devices 100B-100N and edge orchestrator, edge deployment 100 may include edge gateway device 100A. Edge gateway device 100A may act as a local control plane for edge endpoint devices 100B-100N, and gateway device to edge orchestrator 104. For example, any of edge endpoint devices 100B-100N may include limited communications capability such that they may only communicate locally. In contrast, edge gateway device 100A may include broad communications capability and may act as an intermediary for communications between edge endpoint devices 100B-100N and edge orchestrator.

In contrast to edge orchestrator 104, the components of edge deployment 100 may be positioned in a lower security environment. Consequently, malicious actors may be more likely to be able to physically access the components of edge deployment 100.

To attempt to compromise the security of edge deployment 100 and/or edge orchestrator 104, the malicious actor may physically replace edge gateway device 100A (and/or other edge devices) with a malicious device. The malicious device may masquerade as edge gateway device 100A.

For example, the malicious device may attempt to issue commands to edge endpoint devices 100B-100N, may snoop data transmissions between edge endpoint devices 100B-100N and edge orchestrator (e.g., to gain access to sensitive data), may attempt to compromise edge orchestrator 104 (e.g., by sending malware and/or other malicious communications to edge orchestrator 104, and/or may otherwise perform malicious actions. If successful, the malicious device may compromise the security and/or integrity of other components of edge deployment 100 and/or other devices (e.g., 104) connected to edge deployment.

In general, embodiments disclosed here relate to systems and methods for proactively identifying and managing activity of malicious devices in edge deployment. By proactively identifying and managing malicious devices, impacts of activity of malicious devices may be reduced. For example, when a malicious device is identified, the malicious device may be quarantined thereby preventing it from interacting with the components of edge deployment and/or other devices (e.g., 104) connected to edge deployment 100.

To proactively identify and manage malicious devices, the system of FIG. 1 may require that members of edge deployment be validated prior to and/or during operation of edge deployment 100. By requiring that the devices of edge deployment 100 be validated, malicious devices that are unable to be validated may be identified and managed accordingly.

To validate components of edge deployment 100, edge orchestrator 104 may require that all devices that connect to it use a digital identity to validate themselves. For example, edge orchestrator 104 may respond to requests for connection (e.g., from edge gateway device 100A) with requests for verification. The request for verification may require submission of a digital identity by edge gateway device 100A. The digital identity may have been assigned to edge gateway device 100A when manufactured, when purchased from the manufacturer or reseller, etc.

When edge orchestrator 104 receives the digital identity (and/or a response to a challenge generated using the digital identity), the response may be analyzed (e.g., cryptographically) to ascertain whether the entity that provided the response can be authenticated. If authenticated, edge orchestrator 104 treat edge gateway device 104A as being trusted and use it to manage operations of edge deployment 100.

If not authenticated, then edge orchestrator 104 may not trust edge gateway device 100A to manage operations of edge deployment 100. For example, edge orchestrator 104 may quarantine edge gateway device 100A.

Once initially authenticated, the components of edge deployment 100 may be repeatedly reauthenticated. If, at any time, a component fails authentication, edge orchestrator 104 may take action to limit activity of the component (e.g., through quarantining). In this way, should edge gateway device 100A be substituted with an unauthorized device (e.g., a malicious device), the malicious device may be proactively identified and managed accordingly.

To provide the above noted functionality, the system may include edge deployment 100, edge gateway device 100A, edge endpoint device 100B-100N, edge orchestrator 104, and communication system 102.

Figure 2A:
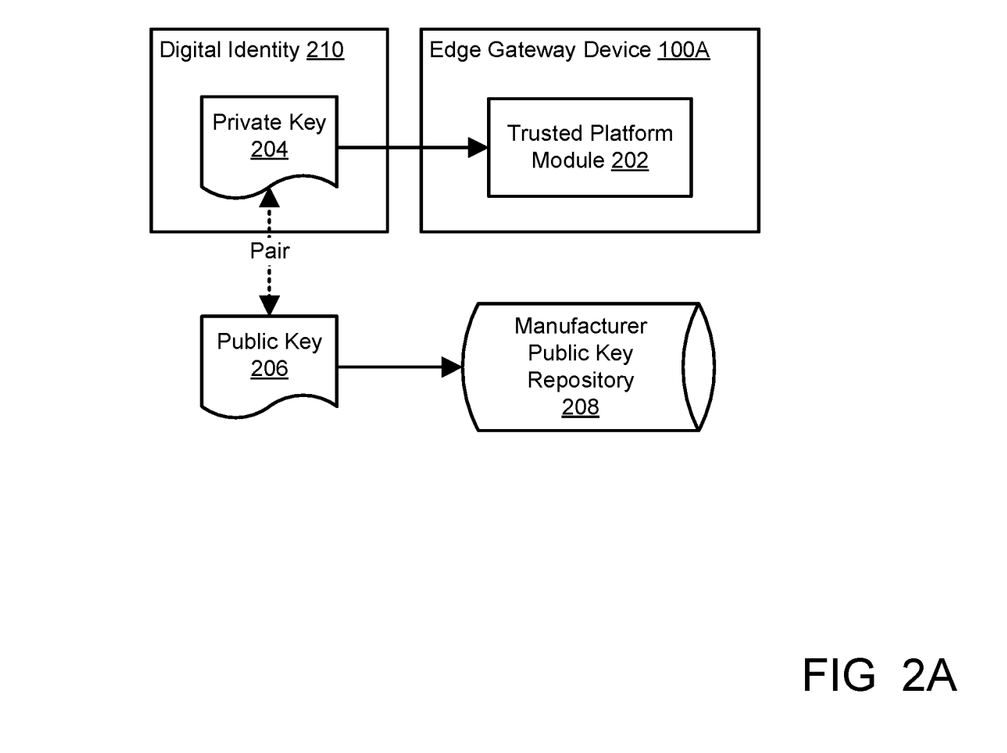
FIG. 2A shows a first data flow diagram illustrating operation of a portion of a system in accordance with an embodiment.

Edge gateway device 100A may be implemented using a hardware device. The hardware device may manage operations of edge endpoint device 100B-100N, and/or provide other functionalities and include functionality to authenticate itself to other devices. To authenticate itself to other device, Edge gateway device 100A may include a digital identity and use the digital identity to response to authentication challenges. Refer to FIG. 2A for additional details regarding digital identities.

The digital identity may uniquely identify edge gateway device 100A. For example, the digital identity may include a serial number, a private key, and/or other types of information usable to generate responses to authentication challenges.

Edge orchestrator 104 may be implemented using a hardware device. The hardware device may manage edge deployment 100, and include functionality to authenticate components of edge deployment 100. To authenticate components (e.g., edge gateway device 104A) of edge deployment 100, edge orchestrator may issue authentication challenges to the components and receive responses generated by the components using digital identities. If authenticated, edge orchestrator 104 may trust the corresponding components and cooperate with the components to provide computer implemented services. Periodically, edge orchestrator 104 may reauthenticate the components to reduce the likelihood that edge gateway device 100A and/or other components of edge deployment have not been substituted by an unauthorized device.

Figure 2B:
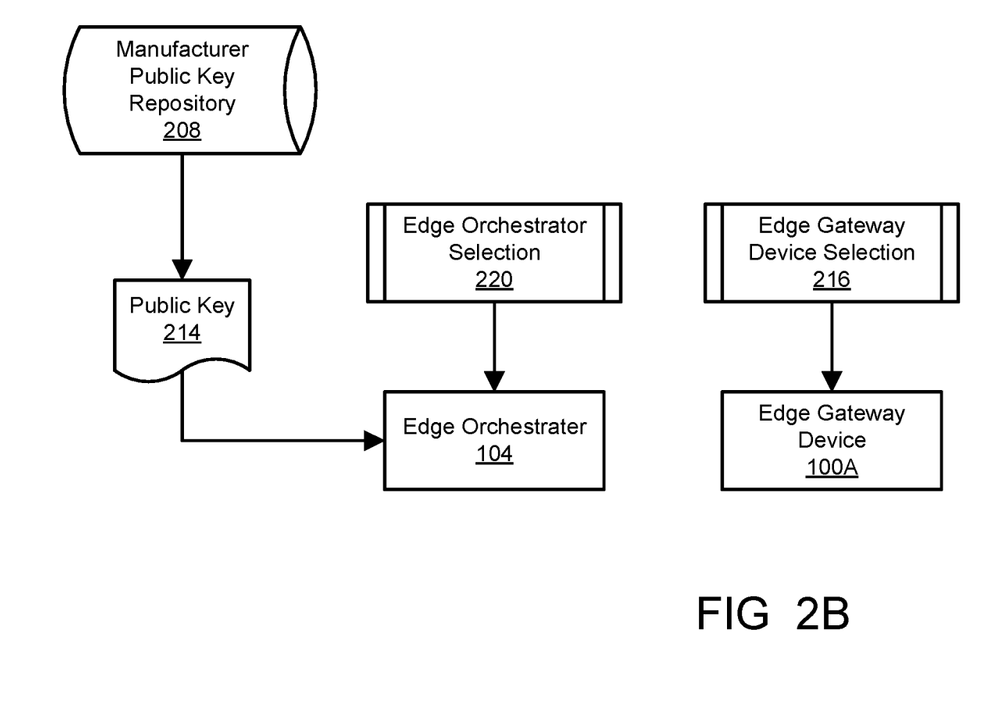
FIG. 2B shows a second data flow diagram illustrating operation of a portion of a system in accordance with an embodiment.
Figure 2C:
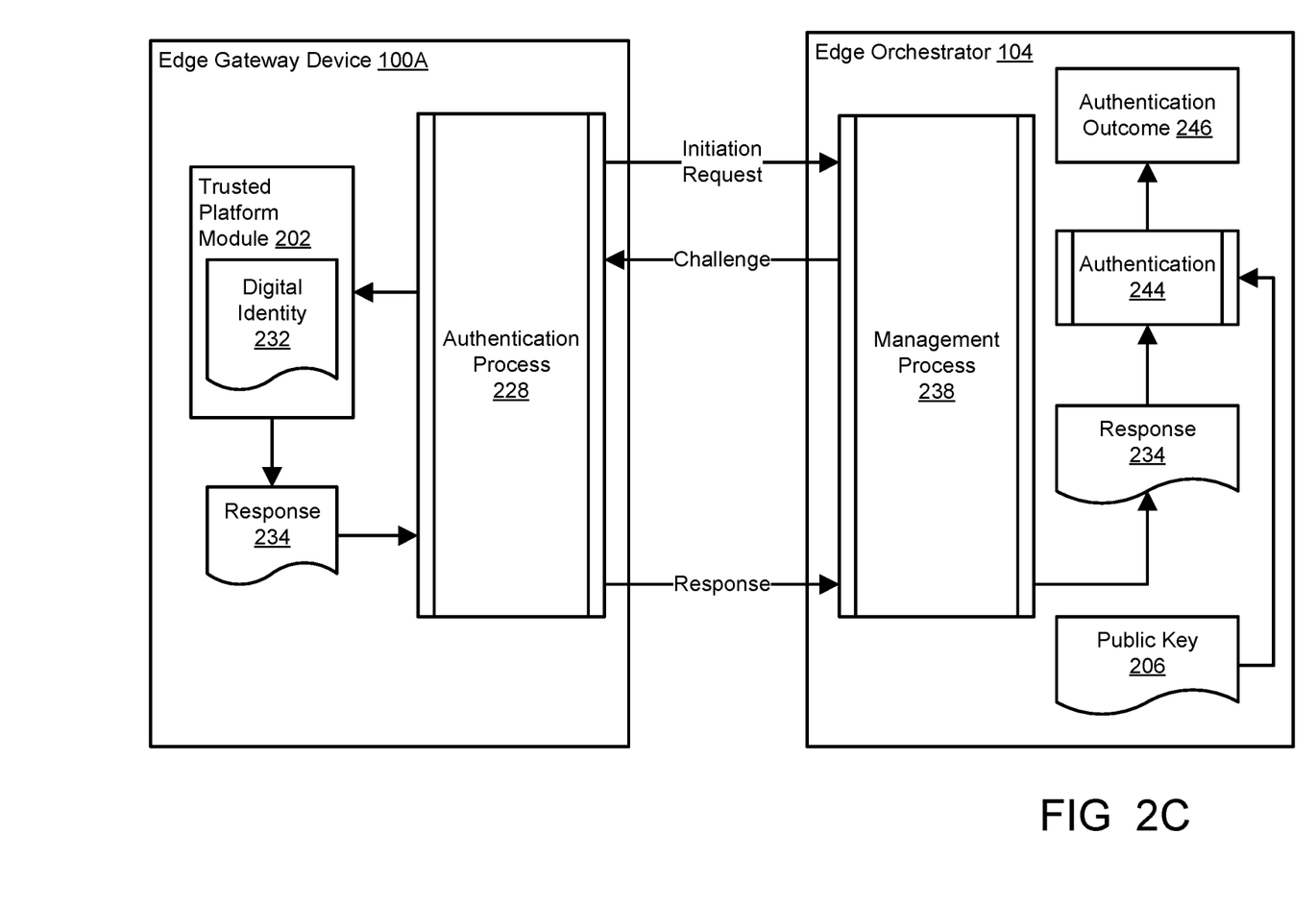
FIG. 2C shows a second data flow diagram illustrating operation of a portion of a system in accordance with an embodiment.

Thus, as identified in FIG. 1, a system in accordance with an embodiment may proactively identity and manage malicious devices by authenticating the components of edge deployment 100. Refer to FIGS. 2B-2C for additional details regarding authentication of components of edge deployment 100.

Any of (and/or components thereof) edge deployment 100 and edge orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams are shown in FIG. 2A-2C. These data flow diagrams show flows of data that may be implemented by the system of FIG. 1. In FIG. 2A, data flows illustrating data structures used in a data flows that may occur during establishment of a digital identity in accordance with an embodiment is shown. In FIG. 2B, data illustrating data structures used in and data flows that may occur during distribution of data usable to check responses to authentication challenges in accordance with an embodiment is shown. In FIG. 2C, data flows illustrating authentication of an edge gateway device with an edge orchestrator in accordance with an embodiment is shown.

Turning to FIG. 2A, a first data flow diagram illustrating data structures used in a data flows that may occur during establishment of a digital identity in accordance with an embodiment is shown.

To establish a digital identity, edge gateway device 100A may include trusted platform module 202. Information regarding a digital identity may be stored and managed by trusted platform module 202.

To establish the digital identity, various information may be collected and stored in trusted platform module 202. In an embodiment, digital identity 210 is implemented with a portion of a key pair (e.g., 204, 206). The keypair may be generated using any process and via any manner that facilitate security of the keypair. The private key (e.g., 204) may be stored in trusted platform module 202, and the corresponding public key 206 may be distributed to a key repository (e.g., may be manufacturer public key repository 208 if established by a manufacturer, but may be stored elsewhere depending on when and how the digital identity is established). Public key 208 may be subsequently distributed to orchestrators or other devices tasked with ensuring that they only cooperate with devices that can be authenticated.

Trusted platform module 202 may be implemented using a hardware device. The hardware device may provide and implement security-related functions. The security functions may include (i) managing secrets, (ii) verifying the operating state of a host device, and (iii) when the operating state is acceptable, facilitating use of the secrets.

In an embodiment, trusted platform module 202 stores private key 204 and utilizes private key 204 to generate signatures for payloads using private key 204. Trusted platform module 202 may limit use of the private key to periods of time when the security state of edge gateway device 100A can be verified. Trusted platform module 202 may include functionality to check the security state of edge gateway device 100A.

Manufacturer public key repository 208 may be implemented using a database or other data structure hosted by one or more data processing systems. The database may include one or more public keys and/or other information usable to validate responses to authentication challenges Thus, using the flow shown in FIG. 2A, embodiments disclosed herein may facilitate deployment and use of digital identities. The digital identities may be used to authenticate a device to another device. For another device to authenticate a device that has a digital identity, the other device may need access to data usable to check responses to authentication challenges.

Turning to FIG. 2B, a second data flow diagram illustrating data structures used in and data flows that may occur during distribution of data usable to check responses to authentication challenges in accordance with an embodiment is shown.

To distribute data usable to check responses to authentication requests, the data may be deployed to an edge orchestrator that will cooperate with an edge gateway device. When an edge deployment is established and/or part of establishing the edge deployment, an edge gateway device may be selected via edge gateway device selection 216 process. Edge gateway device selection 216 process may be performed by an edge gateway vendor, which may perform the process (e.g., electronic commerce platform) to gather information regarding needs of customers, suggest edge gateway devices that may meet the customer's needs, and facilitate acquisition of edge gateway devices by the customers. Through edge gateway device selection process 216, an operator of an edge deployment may obtain edge gateway device 100A. Once obtained, the customer may add the edge gateway device to an edge deployment.

Once added to the edge deployment, the operator of the edge deployment may deploy the data usable to verify challenge responses to an orchestrator tasked with managing the edge deployment. To do so, edge orchestrator selection 220 process may be performed to identify an edge orchestrator to manage edge gateway device 100A. For example, edge orchestrator 104 may be selected based on its responsibility as a manager for the edge deployment for which edge gateway device 100A is a member.

Once selected, the data (e.g., public key 214) usable to authenticate challenge responses may be obtained from manufacturer public key repository 208 and stored with edge orchestrator 104. The data may be obtained and stored using any mechanism (e.g., the customer may have an account with the vendor, which may be used to authenticate the customer to a manufacturer/reseller, and the manufacturer/reseller's commerce platform may facilitate access to the corresponding public key 214).

Edge gateway device selection 216 may be implemented using a process. The process may regulate the selection of edge gateway device 100A. Factors that may regulate the selection of edge gateway device selection 216 may include (i) software and hardware capabilities of edge gateway device 100A, (ii) the number of edge endpoint devices that edge gateway device 100A may be able to manage, (iii) security features of edge gateway device 100A, etc.

For example, consider a scenario in which a coffee shop owner manages multiple coffee shops within a city. To manage the multiple coffee shops, the owner may want to manage and regulate endpoint devices in each of the coffee shops. Endpoint devices in each coffee shop may function to automate processes such as but not limited to (i) taking orders from customers, (ii) cleaning equipment at the end of the day, and (iii) managing of dispensing of soft drinks. To manage automation of these processes, the coffee shop owner may begin selection of edge gateway device 100A for each coffee shop. The coffee shop owner may need to understand what specifications must be fulfilled for each coffee shop in order to choose a sufficient type of device of edge gateway device 100A.

Edge gateway device 100A may be similar to edge gateway device 100A shown in FIG. 1.

Continuing with the example scenario, once edge gateway device selection 218 is completed by the coffee shop owner, one or more of edge gateway device 100A may be purchased (e.g., as part of the selection process). The coffee shop owner may purchase at least one edge gateway device 100A for each coffee shop. To manage all coffee shops similarly, each of edge gateway device 100A may require similar instructions. Similar instructions may be given to each of edge gateway device 100A through edge orchestrator 104. To select an edge orchestrator for each location, edge orchestrator selection 220 may be performed.

Edge orchestrator selection 220 may be implemented using a process. The process may regulate selection of edge orchestrator 104. Selection of edge orchestrator 104 may require accounting of all devices of a type like edge gateway device 100A. Accounting for all edge gateway devices may determine, for example, what software and security processes may need to be implemented by edge orchestrator 104 and the digital identities of each edge gateway device. Once the requirements may be known, edge orchestrator 104 may be purchased.

Returning to the example scenario, the coffee shop owner may have five coffee shops within a city, and may have purchased one of edge gateway device 100A for each coffee shop. To uniformly manage processes within each coffee shop, the coffee shop owner may need to utilize edge orchestrator 104. To know what type of edge orchestrator 104 to utilize, the coffee shop owner may need to understand, for example, (i) what processes to manage on each device of edge gateway device 100A, (ii) what security features need to be implemented and regularly updated, (iii) what the digital identities are on each device of edge gateway device 100A. With these prerequisites, the coffee shop owner may be able to purchase edge orchestrator 104 that may be appropriate to manage one or more devices of edge gateway device 100A.

Once deployed, edge orchestrator 104 may have had one or more of public key 214 stored on edge orchestrator 104 from Manufacturer public key repository 212. Each instance of public key 214 may form a public/private key pair with private keys on each edge gateway device 100A that the coffee shop owner may have purchased. The coffee shop owner may authenticate each of edge gateway device 100A on edge orchestrator 104 using the public/private key pairs. Upon authentication, edge orchestrator 104 may begin to manage the coffee shops through management of processes performed by each edge gateway device 100A. For security purposes, edge orchestrator 104 may reauthenticate each of edge gateway device 100A at various intervals of the lifecycle of each device.

Thus, the flows shown in FIG. 2B may place an edge orchestrator in condition to authenticate edge gateway devices.

Turning to FIG. 2C, a third data flow diagram illustrating data structures used in and data flows that may occur during operation of an edge deployment in accordance with an embodiment is shown. The third data flow may be used to authenticate edge gateway devices.

During operation of the edge deployment, edge gateway device 100A may attempt to communicate with edge orchestrator 104. However, prior to being allowed to communicate and interact with edge orchestrator 104, edge orchestrator 104 may be require that edge gateway device 100A be authenticated.

For example, when edge gateway device 100A begins to operate, edge gateway device 100A may automatically perform authentication process 228. Edge gateway device 100A may perform authentication by attempting to establish a communication channel with edge orchestrator 104. During authentication process, edge gateway device 100A may initiate communications with and seek management of operations by edge orchestrator 104. To do so, an initiation request may be transmitted to edge orchestrator 104 via a communication link (not shown).

To manage attempt at communicating with it, edge orchestrator 104 may perform management process 238. During management process 238, initiation requests from edge gateway devices may be processed. The processing may include generation of a corresponding challenge, and responding to the initiation request with the challenge.

In response to receiving the challenge, edge gateway device 226 may utilize trusted platform module 202 to generate a response. Trusted platform module 230 may manage digital identity 232, which may include private key 204 discussed with respect to FIG. 2A and/or other data usable to obtain response 234. Response 234 may include a payload and a cryptographically verifiable signature. The payload may include information unique to edge gateway device 100A, such as combination of various identifiers from components of the edge gateway device. Once generated, response 234 may be provided to edge orchestrator 104.

When obtained, management process 238 may initiate analysis of response 234 to ascertain whether edge gateway device 100A can be authenticated. To do so, authentication 244 process may be performed. During authentication 244 process, response 234 and public key 206 may be ingested by a signature verification algorithm to ascertain whether (i) the signature (or other type of cryptographic data) was generated with a private key corresponding to public key 206, and (ii) whether the payload has been modified after the signature has been generated. This check may be used to establish authentication outcome 246 (e.g., whether edge gateway device 100A can be authenticated).

If the signature can be verified and payload has not been modified, then authentication outcome 246 may indicate that edge gateway device 100A is authentic. Otherwise, authentication outcome 246 may indicate that edge gateway device 100A cannot be authenticated.

The aforementioned process may be performed to validate edge gateway devices in various settings. For example, returning to the coffee shop scenario discussed with respect to FIG. 2B, the coffee shop owner may attempt to establish a communication channel between one device of edge gateway device in a coffee shop and an edge orchestrator. The edge gateway device may communicate to edge orchestrator and proceed to perform a similar authentication as described with respect to FIG. 2C.

If the edge gateway device cannot be validated, the orchestrator may notify the coffee shop owner that the edge gateway device can or cannot be validated. If unable to be validated, the edge gateway device and corresponding edge device managed by the edge gateway device may not be able to be configured and managed to provide the necessary services to the coffee shop. Consequently, the coffee shop owner may take action to address the issue, such as traveling to the coffee shop where the edge gateway device is located to check on the edge gateway device (e.g., to see if it has been physically replaced with a malicious device).

Thus, in FIG. 2C, a third data flow may illustrate an edge gateway device that may be authenticated with an edge orchestrator.

Figure 3A:
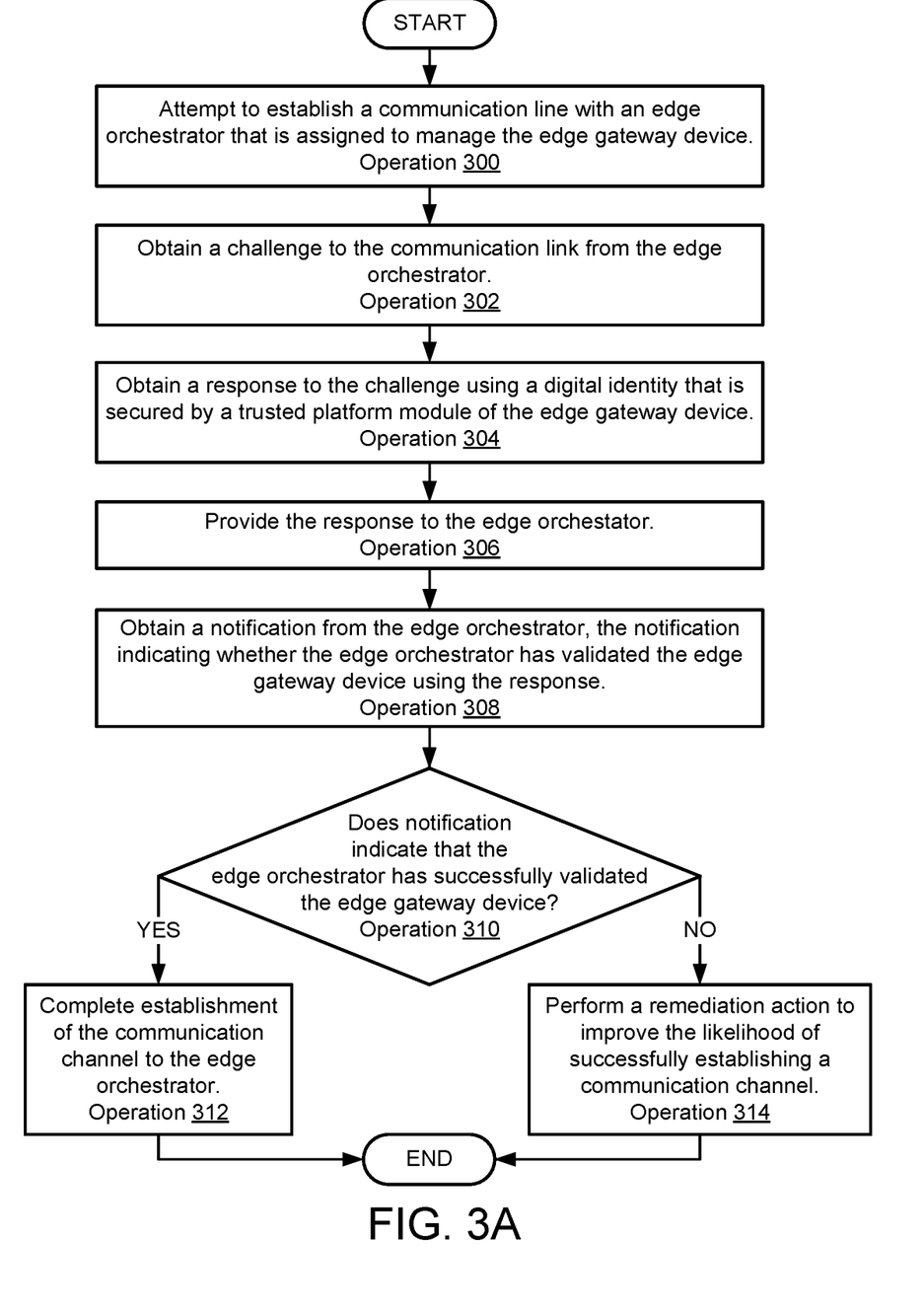
FIG. 3A show flow diagrams illustrating a method of establishing a communication channel between an edge gateway device and an edge orchestrator in accordance with an embodiment.
Figure 3B:
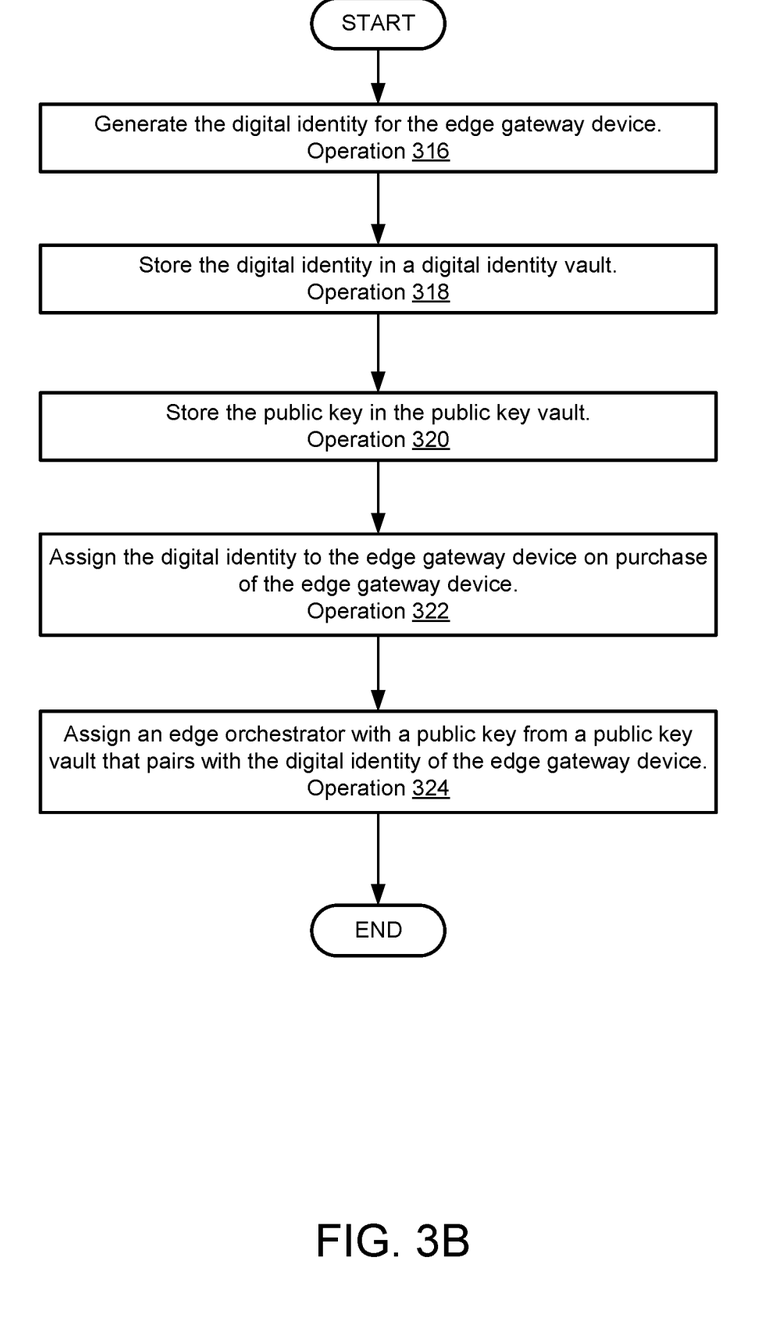
FIG. 3B show flow diagrams illustrating setup of an edge gateway device in accordance with an embodiment.

As discussed above, the components of FIG. 1 may perform various methods to manage operations on edge deployment 100 and edge orchestrator 104. FIGS. 3A-3B illustrate multiple methods that may be performed by the components of FIG. 1. In the diagrams discussed below and shown in FIGS. 3A-3B, any of the operations may be repeated, performed in different orders, and/or performed in parallel with and/or in a partially overlapping in time manner with other operations.

Turning to FIG. 3A, a flow diagram illustrating a method of establishing a communication channel between an edge gateway device and an edge orchestrator is shown. The method may be performed, for example, by one or more of edge gateway device 100A-100N and edge orchestrator 104, and/or other components of the system of FIG. 1.

At operation 300, an attempt may be made at establishing a communication line with an edge orchestrator that is assigned to manage an edge gateway device. The attempt may be made by sending, by the edge gateway device, a notification to the edge orchestrator to establish a communication channel.

At operation 302, a challenge may be obtained from the edge orchestrator. The challenge may be obtained by receiving a response, by the edge gateway device, from the edge orchestrator for more information on the identity of the edge gateway device.

At operation 304, a response to the challenge may be obtained using a digital identity that is secured by a trusted platform module of the edge gateway device. The response to the challenge may be obtained by generating a data structure that may include the digital identity of the edge gateway device.

At operation 306, the response may be provided to the edge orchestrator. The response may be provided by sending the data structure, that may include the digital identity of the edge gateway device, to the edge orchestrator.

At operation 308, a notification from the edge orchestrator may be obtained. The notification may indicate whether the edge orchestrator has validated the edge gateway device using the response. The notification may be obtained by receiving a message from edge orchestrator.

At operation 310, a determination may be made regarding whether the notification may indicate that the edge orchestrator has successfully validated the edge gateway device. The edge orchestrator may validate the edge gateway device by confirming the digital identity cryptographically pairs with the public key.

If the edge gateway device has been successfully authenticated by the edge orchestrator, then the method may proceed at operation 312. If the edge orchestrator cannot successfully validate the edge gateway device, then the method may proceed at operation 314.

At operation 312, establishment of the communication channel to the edge orchestrator may be completed. Establishment of the communication channel may be completed by allowing further connection of the edge gateway device to the edge orchestrator and managing of operations of the edge gateway device by the edge orchestrator. Further connection of the edge gateway device to the edge orchestrator may be allowed by creating a communication channel and may periodically reauthenticating the edge gateway device with the edge orchestrator. Operations of the edge gateway device may be managed by the edge orchestrator by directing processes of the edge gateway device and sending software updates to the edge gateway device.

The method may end following operation 312.

Returning to operation 310, the method may proceed to operation 314 when the notification indicates that the edge gateway device was not validated successfully.

At operation 314, a remediation action may be performed to improve the likelihood of successfully establishing a communication channel. The remediation action may be performed by (i) issuing, by the edge orchestrator, a new challenge to the edge gateway device with which to verify the digital identity of the edge gateway device, and/or (ii) updating processes and/or hardware on the edge gateway device to improve responses to the challenge by the edge gateway device The method may end following operation 312 or 314.

Turning to FIG. 3B, a flow diagram illustrating setup for future authentication of an edge gateway device is shown. The operations of this method may be performed before the operations illustrated in FIG. 3A. The method may be performed, for example, by one or more of edge gateway device 100A-100N and edge orchestrator 104, and/or other components of the system of FIG. 1.

At operation 316, the digital identity may be generated for the edge gateway device. The digital identity may be generated by implementing software to generate a random sequence of numeric or alphanumeric characters.

At operation 318, the digital identity (e.g., discussed with respect to operation 304) may be stored in a digital identity vault. The digital identity may be stored by cataloging the digital identity in a database that may include the digital identities assigned to all manufactured edge gateway devices.

At operation 320, a public key may be stored in a public key vault. The public key vault may be paired with the digital identity. The public key may be stored by cataloging the public key in a database that may include the public keys assigned to all manufactured edge gateway devices.

At operation 322, the digital identity may be assigned to the edge gateway device on manufacture of the edge gateway device. The digital identity may be assigned by storing the digital identity on the trusted platform module of the edge gateway device. The digital identity may be stored by storing the digital identity in an immutable form in the edge gateway device. The digital identity may be stored in an immutable form of the edge gateway device by writing the digital identity to the trusted platform module.

At operation 324, an edge orchestrator may be assigned with a public key from a public key vault that pairs with the digital identity of the edge gateway device. An edge orchestrator may be assigned with a public key by storing on the edge orchestrator.

The method may end at operation 324.

Figure 4:
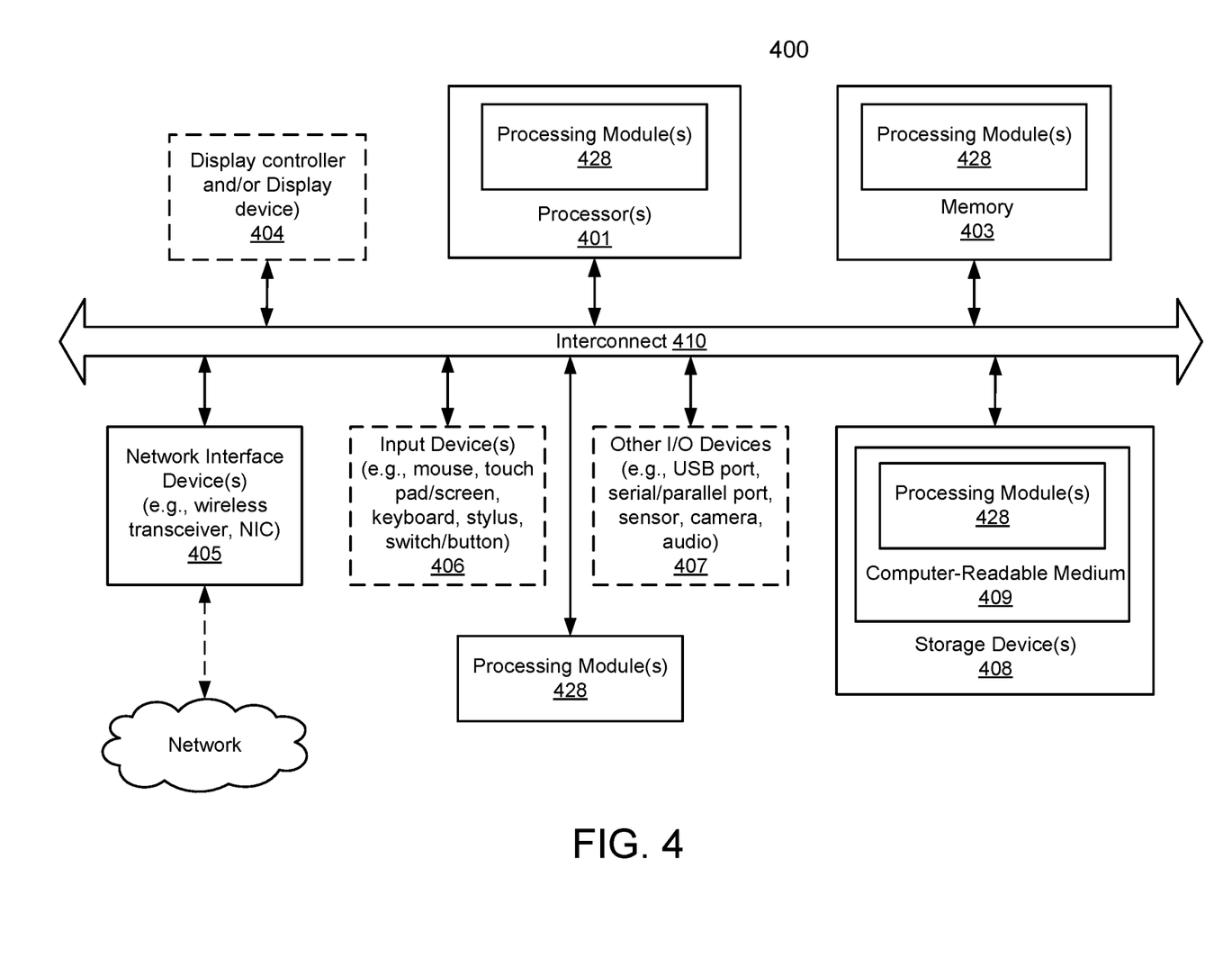
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing network access of an edge gateway device, the method comprising:
    attempting, by the edge gateway device, to establish a communication channel with an edge orchestrator that is assigned to manage the edge gateway device;
    obtaining, by the edge gateway device, a challenge to the communication channel from the edge orchestrator;
    obtaining, by the edge gateway device, a response to the challenge using a digital identity that is secured by a trusted platform module of the edge gateway device;
    providing, by the edge gateway device, the response to the edge orchestrator;
    obtaining, by the edge gateway device, a notification from the edge orchestrator, the notification indicating whether the edge orchestrator has validated the edge gateway device using the response;
    in a first instance of the obtaining the notification where the notification indicates that the edge orchestrator successfully validated the edge gateway device:
        completing establishment of the communication channel to the edge orchestrator; and
    in a second instance of the obtaining the notification where the notification indicates that the edge orchestrator was not successfully validated the edge gateway device:
        performing a remediation action to improve a likelihood of successfully establishing the communication channel.

2. The method of claim 1, further comprising:
    prior to assigning the digital identity:
        generating the digital identity for the edge gateway device;
        storing the digital identity in a digital identity vault;
        storing a public key in a public key vault, wherein the public key is paired with the digital identity;
        assigning the digital identity to the edge gateway device on purchase of the edge gateway device; and
        assigning the edge orchestrator with a public key from a public key vault that pairs with the digital identity of the edge gateway device.

3. The method of claim 2, wherein assigning the digital identity comprises:
    storing the digital identity on a trusted platform module of the edge gateway device.

4. The method of claim 3, wherein storing the digital identity comprises:
    storing the digital identity in an immutable form in the edge gateway device.

5. The method of claim 1, wherein obtaining, by the edge gateway device, the notification from the edge orchestrator:
    validating the digital identity of the edge gateway device corresponding with a public key on the edge orchestrator.

6. The method of claim 1, wherein obtaining, by the edge gateway device, the notification from the edge orchestrator that the edge orchestrator successfully validated the edge gateway device comprises:
    allowing further connection of the edge gateway device to the edge orchestrator; and
    managing of operations of the edge gateway device by the edge orchestrator.

7. The method of claim 1, wherein obtaining the notification where the notification indicates that the edge orchestrator was not successfully validated the edge gateway device comprises:
    restricting further connection of the edge gateway device to the edge orchestrator until remediation by the edge gateway device may be sufficient to establish the communication channel.

8. A non-transitory machine-readable medium having instructions stored therein, which when executed by a processor, cause the processor to perform operations for managing network access of an edge gateway device, the operation comprising:
    attempting, by the edge gateway device, to establish a communication channel with an edge orchestrator that is assigned to manage the edge gateway device;
    obtaining, by the edge gateway device, a challenge to the communication channel from the edge orchestrator;
    obtaining, by the edge gateway device, a response to the challenge using a digital identity that is secured by a trusted platform module of the edge gateway device;
    providing, by the edge gateway device, the response to the edge orchestrator;
    obtaining, by the edge gateway device, a notification from the edge orchestrator, the notification indicating whether the edge orchestrator has validated the edge gateway device using the response;
    in a first instance of the obtaining the notification where the notification indicates that the edge orchestrator successfully validated the edge gateway device:

completing establishment of the communication channel to the edge orchestrator; and in a second instance of the obtaining the notification where the notification indicates that the edge orchestrator was not successfully validated the edge gateway device:

performing a remediation action to improve a likelihood of successfully establishing the communication channel.

9. The non-transitory machine-readable medium of claim 8, wherein the operations further comprise:

prior to assigning the digital identity:

generating the digital identity for the edge gateway device;

storing the digital identity in a digital identity vault;

storing a public key in a public key vault, wherein the public key is paired with the digital identity;

assigning the digital identity to the edge gateway device on purchase of the edge gateway device; and assigning the edge orchestrator with a public key from a public key vault that pairs with the digital identity of the edge gateway device.

10. The non-transitory machine-readable medium of claim 9, wherein assigning the digital identity comprises:

storing the digital identity on a trusted platform module of the edge gateway device.

11. The non-transitory machine-readable medium of claim 10, wherein storing the digital identity comprises:

storing the digital identity in an immutable form in the edge gateway device.

12. The non-transitory machine-readable medium of claim 8, wherein obtaining, by the edge gateway device, the notification from the edge orchestrator:

validating the digital identity of the edge gateway device corresponding with a public key on the edge orchestrator.

13. The non-transitory machine-readable medium of claim 8, wherein obtaining, by the edge gateway device, the notification from the edge orchestrator that the edge orchestrator successfully validated the edge gateway device comprises:

allowing further connection of the edge gateway device to the edge orchestrator; and managing of operations of the edge gateway device by the edge orchestrator.

14. The non-transitory machine-readable medium of claim 8, wherein obtaining the notification where the notification indicates that the edge orchestrator was not successfully validated the edge gateway device comprises:

restricting further connection of the edge gateway device to the edge orchestrator until remediation by the edge gateway device may be sufficient to establish the communication channel.

15. A data processing system, comprising:

a processor; and a memory coupled to the processor to store instructions, which when executed by the processor, cause the processor to perform operations for managing network access of an edge gateway device, the operations comprising:

attempting, by the edge gateway device, to establish a communication channel with an edge orchestrator that is assigned to manage the edge gateway device;

obtaining, by the edge gateway device, a challenge to the communication channel from the edge orchestrator;

obtaining, by the edge gateway device, a response to the challenge using a digital identity that is secured by a trusted platform module of the edge gateway device;

providing, by the edge gateway device, the response to the edge orchestrator;

obtaining, by the edge gateway device, a notification from the edge orchestrator, the notification indicating whether the edge orchestrator has validated the edge gateway device using the response;

in a first instance of the obtaining the notification where the notification indicates that the edge orchestrator successfully validated the edge gateway device:

completing establishment of the communication channel to the edge orchestrator; and in a second instance of the obtaining the notification where the notification indicates that the edge orchestrator was not successfully validated the edge gateway device:

performing a remediation action to improve a likelihood of successfully establishing the communication channel.

16. The data processing system of claim 15, wherein the operations further comprise:

prior to assigning the digital identity:

generating the digital identity for the edge gateway device;

storing the digital identity in a digital identity vault;

storing a public key in a public key vault, wherein the public key is paired with the digital identity;

assigning the digital identity to the edge gateway device on purchase of the edge gateway device; and assigning the edge orchestrator with a public key from a public key vault that pairs with the digital identity of the edge gateway device.

17. The data processing system of claim 16, wherein assigning the digital identity comprises:

storing the digital identity on a trusted platform module of the edge gateway device.

18. The data processing system of claim 17, wherein storing the digital identity comprises:

depositing the digital identity in an immutable form in the edge gateway device.

19. The data processing system of claim 15 wherein obtaining, by the edge gateway device, the notification from the edge orchestrator:

validating the digital identity of the edge gateway device corresponding with a public key on the edge orchestrator.

20. The data processing system of claim 15, wherein obtaining, by the edge gateway device, the notification from the edge orchestrator that the edge orchestrator successfully validated the edge gateway device comprises:

allowing further connection of the edge gateway device to the edge orchestrator; and managing of operations of the edge gateway device by the edge orchestrator.

* * * * *

UNITED STATES PATENT AND TRADEMARK OFFICE
CERTIFICATE OF CORRECTION

PATENT NO. : 12,363,088 B2  
APPLICATION NO. : 18/358284  
DATED : July 15, 2025  
INVENTOR(S) : Eliyahu Rosenes and Maxim Balin Page 1 of 1

It is certified that error appears in the above-identified patent and that said Letters Patent is hereby corrected as shown below:

In the Claims

Claim 8, Column 16, Line 49, the word "the operation comprising" should instead read as "the operations comprising".

Signed and Sealed this  
Second Day of September, 2025

Coke Morgan Stewart  
*Acting Director of the United States Patent and Trademark Office*